Figure 1:
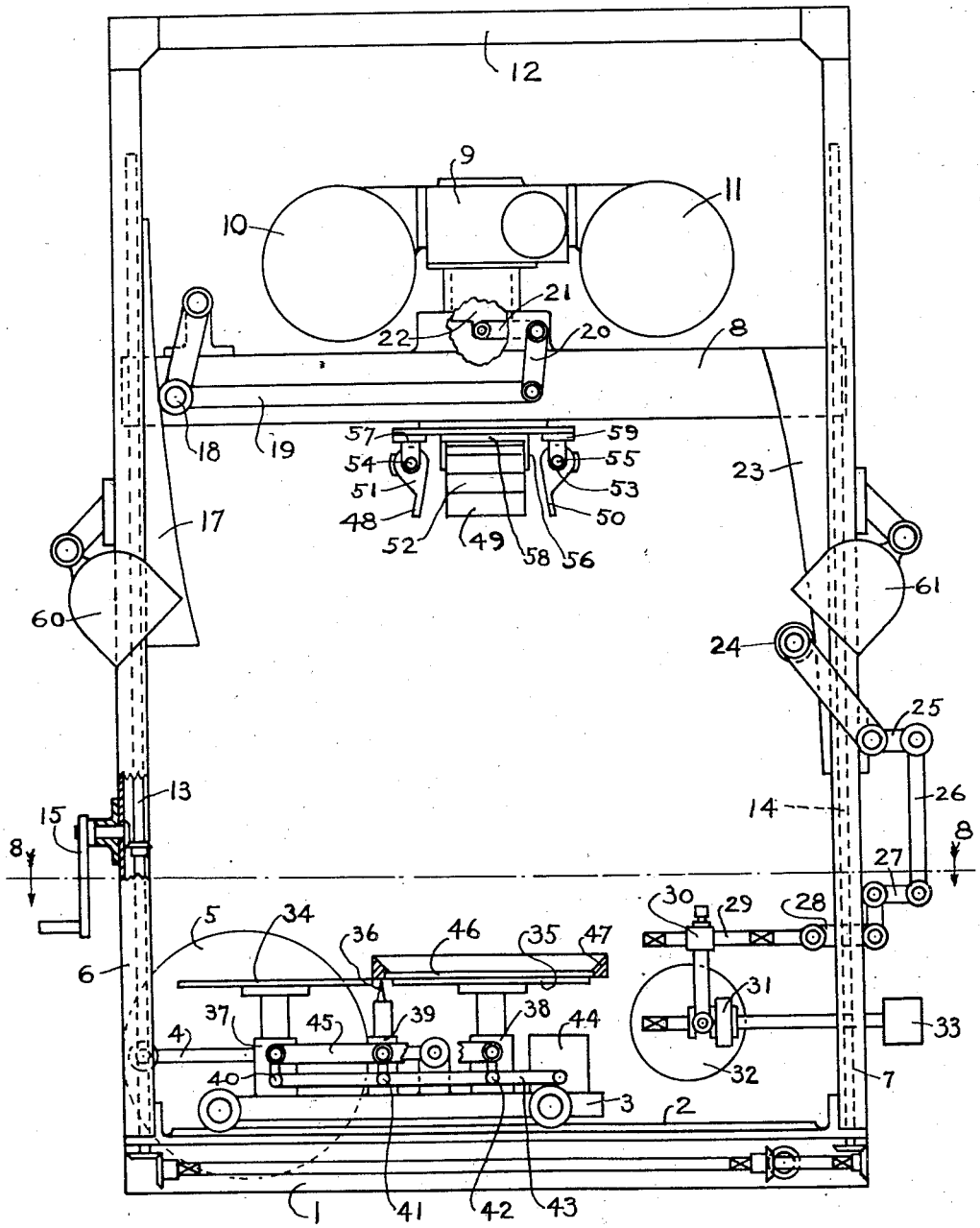

July 18, 1939.  J. H. O'NEILL  2,166,419
MICROPHOTOGRAPHIC APPARATUS
Filed Dec. 18, 1937  5 Sheets-Sheet 1

Inventor
John Hugh O'Neill

July 18, 1939.   J. H. O'NEILL   2,166,419
MICROPHOTOGRAPHIC APPARATUS
Filed Dec. 18, 1937   5 Sheets-Sheet 2

John Hugh O'Neill  Inventor

July 18, 1939. J. H. O'NEILL 2,166,419
MICROPHOTOGRAPHIC APPARATUS
Filed Dec. 18, 1937 5 Sheets-Sheet 3
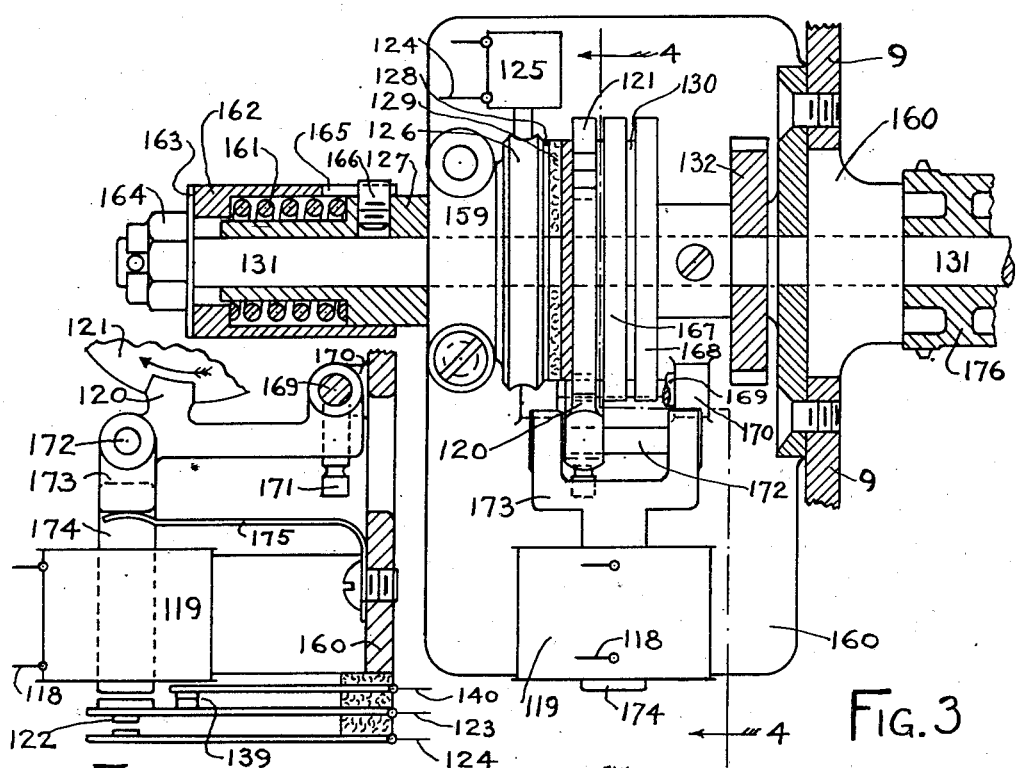
Fig. 3
Fig. 4
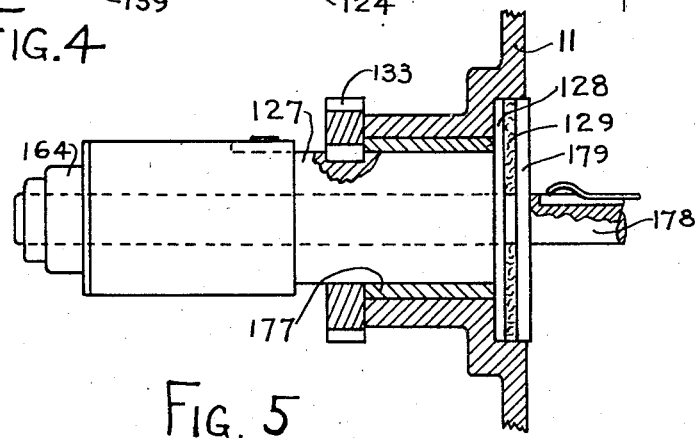
Fig. 5
John Hugh O'Neill, Inventor July 18, 1939.  J. H. O'NEILL  2,166,419
MICROPHOTOGRAPHIC APPARATUS
Filed Dec. 18, 1937   5 Sheets-Sheet 4
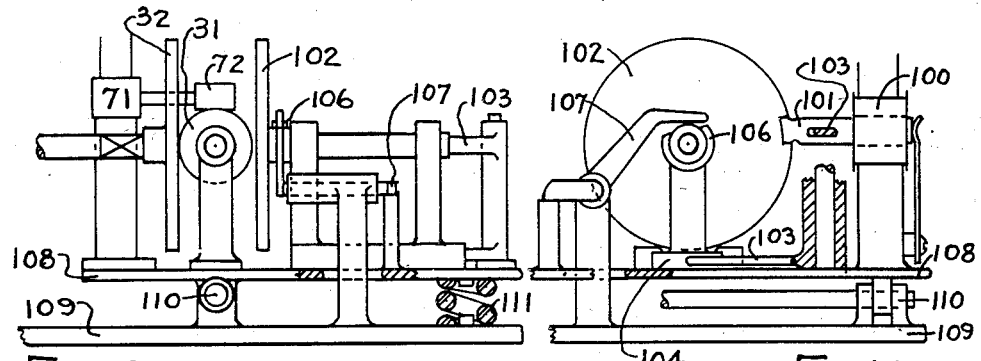
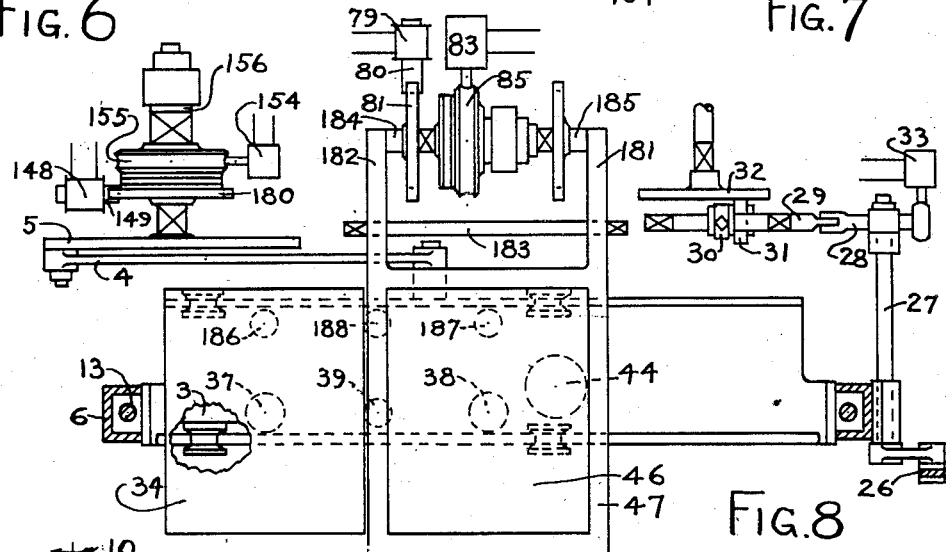
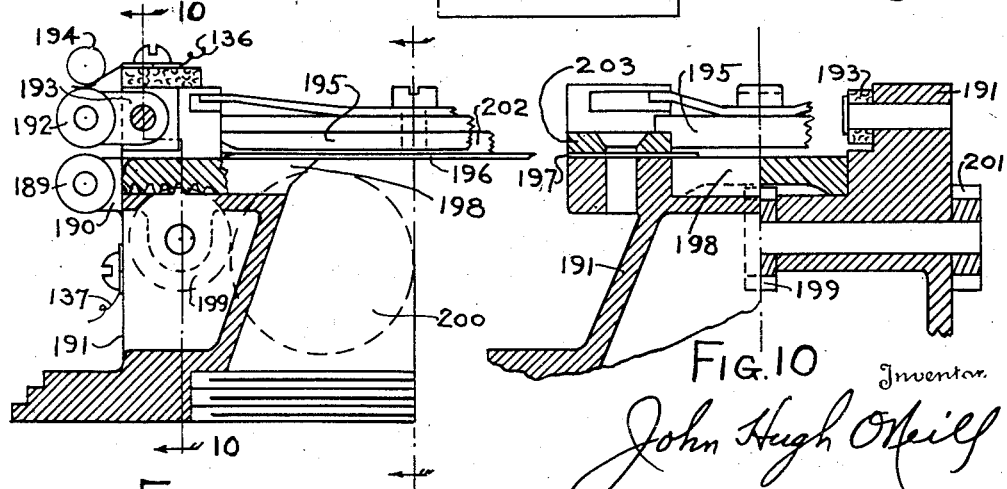
Inventor
John Hugh O'Neill July 18, 1939.　　　　J. H. O'NEILL　　　2,166,419
MICROPHOTOGRAPHIC APPARATUS
Filed Dec. 18, 1937　　　5 Sheets-Sheet 5
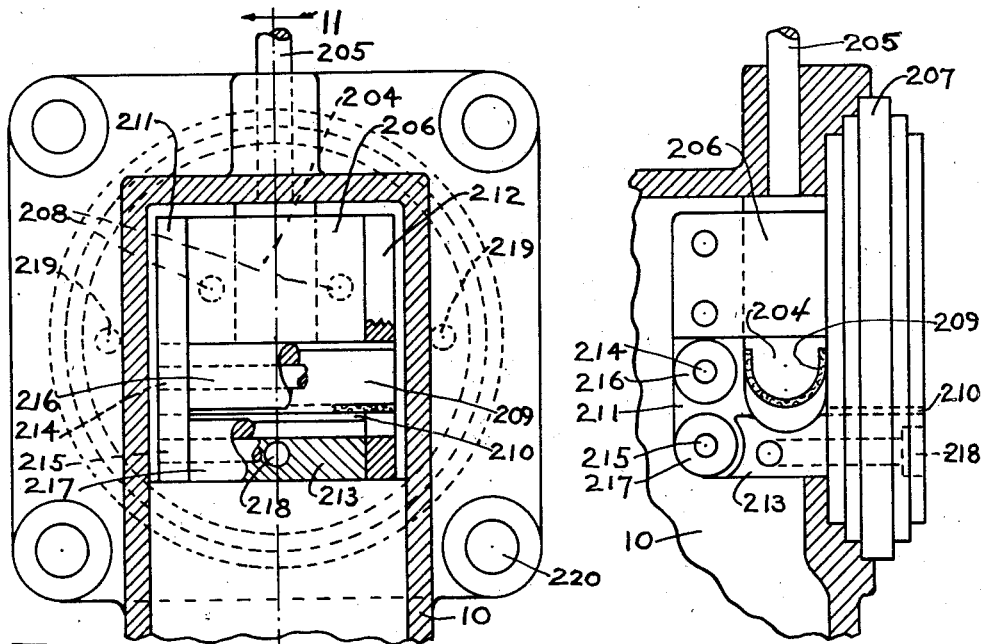
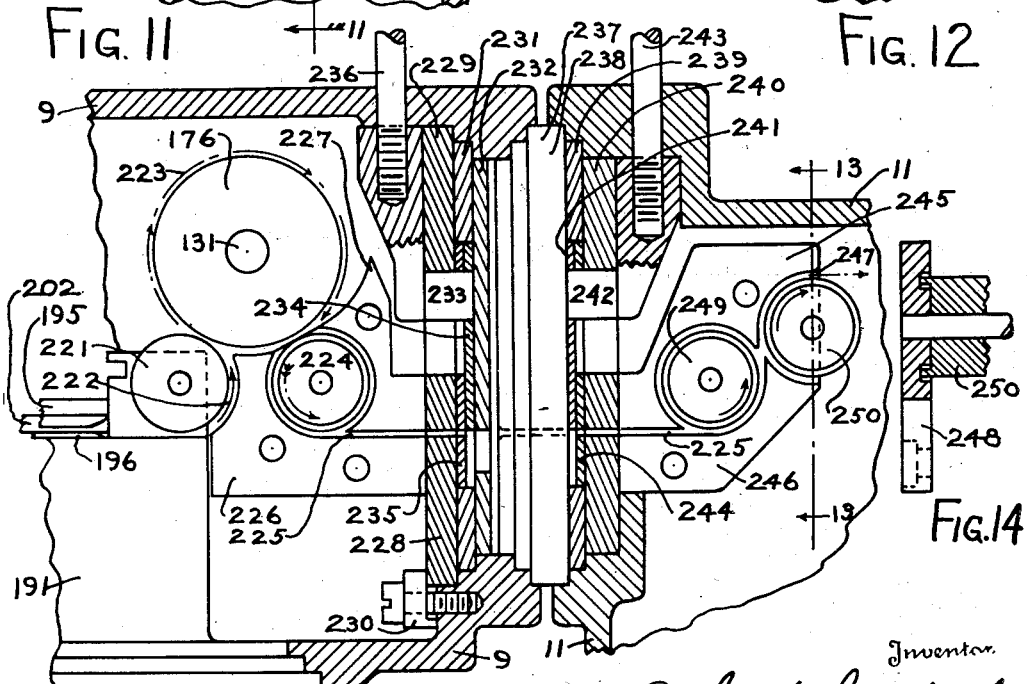
Inventor
John Hugh O'Neill Patented July 18, 1939

2,166,419

UNITED STATES PATENT OFFICE 2,166,419

MICROPHOTOGRAPHIC APPARATUS

John Hugh O'Neill, Arlington, Va.

Application December 18, 1937, Serial No. 180,648

1 Claim. (Cl. 88—24)

My present invention relates to photography, and more particularly to microphotographic apparatus. It has for its general object to provide a very rigid supprt for both the camera body and the copy or material to be photographed; and to further provide an efficient and conveniently operable microphotographic apparatus of the automatic type in which will be properly synchronized the winding or feeding of the film with the exposure of successive picture areas thereof; and also to provide convenient means for the preparation and holding of the copy which is to be photographed. A further object is to provide, outside the camera body, a conveniently located, visible indicator showing the occurrence and duration of the exposure of the film and an audible or other signal to the operator of the approach of the end of the unexposed film to the exposure opening. A further general object of this invention is to provide such a microphotographic apparatus equipped for electric operation and control in such manner furnishing specific functions of a nature that increase the efficiency of the microphotographic apparatus as compared with a manually or mechanically operated mechanism of the same sort.

The improvements are directed in part toward eliminating, as far as possible, natural mistakes incident to manual control; toward reducing the manual effort required in operation; toward simplifying the loading of unexposed film; toward precision in spacing of the exposure areas upon the film with consequent prevention of waste in the film length; toward an improved control of the timing of the exposure; toward a more accurate and speedy focusing than is possible by means other than automatic; toward means of variation of the size of the exposed area of the film; and toward illuminated means for indicating the area of the copy that will be included in the image on the film.

To these and other ends, the invention resides in certain improvements and combinations of parts, all as will be hereinafter more fully described, the novel features being pointed out in the claims at the end of the specification.

Figure 2:
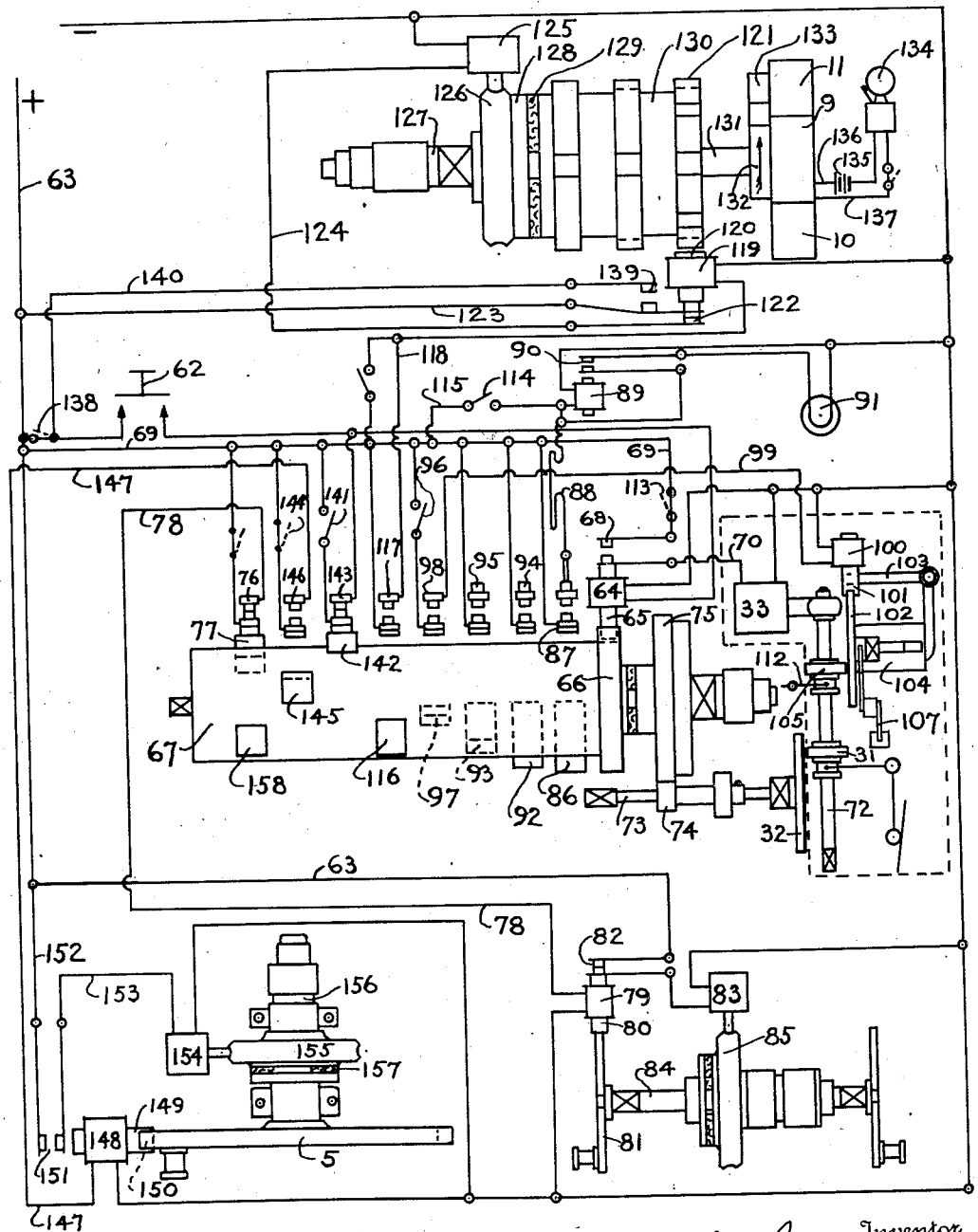

In the drawings:

Figure 1 is a front elevation of a microphotographic apparatus constructed in accordance with and illustrating one embodiment of my invention, Figure 2 is a diagram of various operating parts and of the electric wiring controlling and operating the same, Figure 3 is a partially sectioned plan view of the indexing mechanism, Figure 4 is a partially sectioned partial side elevation projected from Figure 3 on line 4—4, Figure 5 is a partially sectioned elevation of the take-up mechanism of the exposed film magazine, Figure 6 is a partially sectioned side elevation of a portion of the timing mechanism, Figure 7 is a partial end elevation of a portion of the timing mechanism, Figure 8 is a sectional plan view of Figure 1 on line 8—8, Figure 9 is a partial sectional front elevation of the exposure chamber showing the end where unexposed film enters, Figure 10 is a partial sectional elevation of Figure 9, partly on line 9—9 and partly on the center line, Figure 11 is a partial sectional view of the unexposed film magazine, Figure 12 is a partial sectional view of Figure 11 on line 11—11, Figure 13 is a partially sectional view of the exposed film end of the camera body and of the attaching end of the exposed film magazine, Figure 14 is a partial sectional view of Figure 13 on line 13—13.

Similar reference numerals throughout the several views indicate the same parts.

I will first give a general idea of the objects, functions or manner of use and the major elements of construction of the particular microphotographic apparatus that is illustrated herein before going into detail with respect to the particular instrumentalities utilized to accomplish the results.

The microphotographic apparatus disclosed in the present application is adapted to many uses. Without attempting to enumerate the uses and without in any way limiting the scope of the invention, I will more particularly refer to one important use thereof, which is the making of photographic copies of documents, newspapers, books and the like on reels of sensitized film usually of 35 mm. size. From the negatives so made, positive films are made for many uses, such as for reading the projection in reading machines, and for use in projectors on large screens in audience halls. A further use of the negatives so made is to print in readable size by projection, positive copies on sensitized paper as a means of copying desired documents for any purpose such as storing in more permanent form valuable documents, or for sending to distant places copies of desired documents or books from central libraries. On account of the magnification by projection, in reading the film or in printing on sensitized paper from it, the accuracy of the photographic image is most important both in outline and in density, so that projection either for reading or for printing on sensitized paper may be done with a minimum of attention to changes in the illumination employed to attain clear images of uniform high quality. The construction and operation of the various parts of my apparatus contribute to the attaining of most accurate images on the sensitized film and on any number of successive films, all made with great speed and a minimum of manual attention.

The microphotographic apparatus is electrically operated, being connected to a suitable source of electrical energy. It carries illumination for the object or copy material which is held securely and smoothly by a glass plate which is automatically raised off the copy and lowered onto it at predetermined points in the cycle of events.

In a dark room, the film is loaded into the separate, unexposed film magazine, hereafter called the first magazine, with a convenient starting end projecting from said magazine. This starting end is threaded into the camera body, under the pressure plate which locates the exposure area in the focal plane, thence around the indexing sprocket and out of the camera body into the exposed film magazine, referred to hereafter as the second magazine, where it is attached to the take-up spool located at the center of this magazine. After closing the cover plates on the camera body and the second magazine, the camera is ready to operate.

Referring to Figure 1, a preferred embodiment of my invention is shown composed of a base plate 1, which carries rails 2 on which a reciprocating car or table 3 runs transversely of the apparatus, moved a predetermined distance each side of center by connecting rod 4 operably attached to crank disc 5. Two vertical columns 6 and 7 support in very rigid manner a crosshead 8 which carries a camera body 9 to which is removably attached unexposed film magazine 10 referred to as first magazine 10, and exposed film magazine 11 referred to as second magazine 11. A cross bar 12 connects uprights 6 and 7. Means for shifting crosshead 8 up and down is provided by screws 13 and 14 which engage nuts (not shown) in cross head 8 and are rotated either manually by crank 15 or through elevator gears 16 by any source of power such as an electric motor (not shown). A cam 17 is provided, attached to upright 6 which, through roller 18, bar 19, crank arm 20 and yoke 21, is adapted to move lens barrel 22 upward in relation to the film when crosshead 8 is moved upward and to move lens barrel 22 downward, away from the film, when cross head 8 is moved downward thus automatically varying the focus of the objective carried by lens barrel 22 the correct, predetermined amount—as is required in the making of different sizes of the images of the copy.

As more light enters the camera when the camera is far from the copy, as is the case in making greatly reduced images, than when the camera is close to the copy, as when reduction in size of the image is less, it becomes useful to vary the time of exposure in order to obtain the same density of film, the illumination remaining the same. In order to make such change of exposure time automatically and correctly for all positions of crosshead 8 a cam 23 is attached to crosshead 8 and through roller 24, crank 25, link 26, bell-crank 27, link 28, shaft 29 and fork 30, a friction drive wheel 31 is moved a predetermined amount to or from the center of driven disc 32, which operably connects the timer electric motor 33 with the time control drum of the cycle (shown more clearly in Figures 2 and 8). As crosshead 8 is raised to make greater reduction of image, the friction wheel 31 is moved toward the center of disc 32 which causes disc 32 to revolve at a more rapid rate relative to friction wheel 31, thus decreasing the elapsed time of the cycle including the exposure time,—and vice versa, when crosshead 8 is lowered, friction wheel 31 is moved toward the rim of disc 32, thus causing disc 32 to revolve at a slower rate relative to friction drive wheel 31, and increasing the elapsed time of the cycle, including the exposure time.

Car 3 is provided with two platens 34 and 35 adapted to hold the two halves of an opened book with the center of the book supported and located by book center support 36. Elastic and adjustable support for the copy holding platens 34 and 35 and book center support 36 is provided by telescopic, hydraulic cylinders 37, 38 and 39 which contain oil and sufficient air to furnish elasticity. The lower portions of these telescopic cylinders are provided with valves 40, 41 and 42 which, through tube 43, connect all three cylinders with hydraulic reservoir tank 44 which is also charged with air and oil. All three valves 40, 41 and 42 are operably connected by bar 45 so that when a large book is placed unequally open on the platens 34 and 35, the operator can, by moving bar 45 open all valves (40, 41 and 42) and permit the oil to equalize the pressure, with the platens at the different heights necessary in order to bring the two parts of the unequally opened book under the glass plate 46, located in holder frame 47, with approximately equal pressure. As turning of pages in the progress of copying takes place, the pressure against glass plate 46 becomes unequal and an occasional adjustment and equalizing of pressure may be made by the operator moving bar 45 to open valves 40, 41 and 42 and then to close them as he proceeds with the work.

A convenient guide for adjusting the height of the camera when placing copy on platens 34 and 35 is provided by four scanning lights 48, 49, 50 and one not shown, located behind 49. These scanning lights are enclosed in shroudings 51, 52 and 53, with narrow slits pointing slantingly downward and provided with pivotal supports 54, 55 and 56 and sliding bases 57, 58 and 59 so that adjustment may be made to indicate by lines of light on glass plate 46 the area which will be covered by the image on the film.

Uprights 6 and 7 may conveniently carry illuminating means such as lamps 60 and 61.

The cycle of events which is gone through in making one exposure and preparing for the next one is shown in Figure 2 in a combined diagram of wiring and of various parts in which 62 is an electric switch, preferably of one of the push button types which, when closed, causes electric current from a suitable source such as electric line 63 to flow to solenoid 64. When solenoid 64 is energized dog 65, operably connected to plunger core of solenoid 64, is withdrawn from a notch in the periphery of ring 66 on timer barrel 67 which allows timer barrel 67 to rotate. Electric contacts 68 are simultaneously closed by the motion of the core plunger of solenoid 64 and electric current flows through wires 63, 69 and 78 to timer motor 33 which drives timer barrel 67 through reducing gear 71, shaft 72, friction drive wheel 31, friction disc 32, shaft 73 and change gears 74 and 75.

The first event of the cycle is the closing of glass plate 46 down onto the copy placed on platen 35 of Figure 1. This is accomplished by closing of electric contact 76 by cam 77 on timer barrel 67 which furnishes electric current from wire 69 to wire 78 which energizes solenoid 79. The solenoid core withdraws dog 80 from one of two notches on crank disc 81 and also closes electric contact 82 which furnishes electric current from wire 63 to electric motor 83 which drives crank shaft 84 through reduction gearing 85. Crank shaft 84 is operably connected to holder frame 47 as is more clearly shown in Figure 8, and makes one-half revolution when it is stopped by dog 80 engaging the second notch on crank disc 81 thus holding glass plate 46 on the copy at a fixed level while the copy is elastically held up against glass plate 46 by (in this instance) platen 35 and telescopic cylinder 36.

The second event is the opening of the shutter by the passing (in this instance) of shutter cam 86 under electric contact 87 which through plug and flexible wire 88 furnish electric current from wire 69 to solenoid 89, the plunger core of which operates a shutter (not shown) and simultaneously closes electric contact 90 which furnishes electric current in parallel from plug and flexible wire 88 to a signal which is preferably a red light 91 located on or near holder frame 47 so as to be conveniently visible by the operator and indicates the occurrence and duration of the shutter opening. A plurality of shutter cams of varying length may be provided, as shutter cams 92 and 93, and their respective plug sockets on the respective electric contacts 94 and 95 to which plug and flexible wire 88 may be manually shifted for the purpose of changing the time of shutter opening.

Referring to Figure 1, a further change of the time of shutter opening can be made by shifting fork 30 on shaft 29 so that friction drive wheel 31 is placed differently in relation to driven disc 32.

Returning to Figure 2, when a large increase in the time of shutter opening is desired it can be accomplished without altering the other parts of the cycle, by closing switch 96 so that electric current will flow from wire 69, when cam 97 closes electric contact 98, through wire 99 to solenoid 100 which operates to withdraw dog 101 from a notch on the periphery of auxiliary timer disc 102 and also to move one arm of bellcrank 103 so as to cause the other arm to advance slide 104 on which disc 102 is mounted so that disc 102 operably engages friction drive wheel 105 mounted on shaft 72. Thus disc 102 is rotated, and after it has rotated a predetermined amount a cam 106 (shown more clearly of Figures 6 and 7) operates through rocking lever 107 to rotate the rocking bed plate 108 a small amount in relation to main bed plate 109 about hinge 110 thus removing friction drive wheel 31 from driving contact with disc 32 and the main timer barrel 67 ceases to revolve until disc 102 rotates a complete revolution and dog 101 drops into the notch in disc 102, which releases bellcrank 103 and friction disc 102 is no longer pressed against friction drive wheel 105. The rocking lever 107 is also simultaneously released by cam 106 so that rocking bed plate 108 is returned by spring 111 to the original position in which friction drive wheel 31 operably engages disc 32 and the main timer barrel 67 is again driven.

Returning to Figure 2, the speed at which disc 102 revolves may be varied by changing the setting of locating fork 112. Thus the extension of time that the shutter may be kept open can be varied within desired limits without disturbing the sequence and time duration of the other events in the cycle.

A time exposure may be made when desired, by opening switch 113 on electric line 69 which stops the cycle and closing switch 114 on electric line 115 which furnishes electric current to solenoid 89 and opens the shutter (not shown). To close the shutter the switch 114 is opened. To resume the automatic cycle, switch 113 is closed. Plug and flexible wire 88 are removed from electric contact 87 during a time exposure, and replaced afterward.

After the desired exposure is made a new exposure area is brought before the exposure opening by an indexing device which is attached to camera body 9. This is shown also, in more detail, in Figures 3 and 4. After the cams controlling the exposure time have passed their respective electric contacts, the next cam to come into operation is the indexing cam 116, which closes electric contact 117 which supplies electric current from line 69 through electric wire 118 to indexer solenoid 119 which operates to withdraw dog 120 from a notch on the periphery of notched ring 121, and also to close electric contact 122 which supplies electric current from line 63 through electric line 123 and electric line 124 to electric motor 125 which, through reduction gear 126 drives a shell 127, which is provided with a friction disc 128 which, by means of friction washer 129 drives the drum 130 which carries a plurality of variously notched rings such as ring 121. Drum 130 is rigidly attached to a through shaft 131 which carries the film sprocket on the end inside the camera body.

Drum 130 revolves with notched ring 121 driven by motor 125 until dog 120 drops into the next adjacent notch in ring 121, when electric contact 122 is opened and motor 125 comes to a stop. Ring 121 stops, exactly and positively, as dog 120 drops into the respective notch, thus moving the film sprocket and film forward a predetermined amount. The friction joint provided between friction disc 128, friction washer 129 and drum 130 permits motor 125 to over-run while being brought to a stop by the friction joint. Spur gear 132 is rigidly attached to shaft 131 and drives through an intermedate gear (not shown) the take up gear 133 which takes up the film on the winding spool in exposed film magazine 11, as is shown more fully in Figure 5.

A signal, preferably an audible signal such as an alarm bell 134 is provided to warn when the last end of the film is about to reach the exposure opening, as is shown more fully in Figure 9. A source of electric current such as an electric battery 135 furnishes electric current to electric line 136, which, through electric contacts that come together when the end of the film passes from between them, passes current through electric line 137 to an alarm bell 134 and thence back to the opposite pole of the battery. The alarm bell may be placed at any convenient location preferably outside the camera body, and be operated by electric current from any suitable source. A visible signal, or one operated mechanically, may be substituted if desired.

Continuing reference to Figure 2, a safety device may be incorporated which would prevent operating the push button 62 when indexer is operating. This would be accomplished by opening switch 138 so that current would not be directly available from electric line 63 to push button 62, but only when dog 120 is seated in a notch of ring 121 which would open electric contact 122 and close electric contact 139 so that electric current would be available from line 63 through electric line 123, electric contact 139 and electric line 140, to one pole of push button 62.

It is frequently useful to have the microphotographic cycle repeat itself continuously without the use of pushbutton 62. This is accomplished by closing electric switch 141 so that when continuous running cam 142 closes electric contact 143, electric current will flow from electric line 69 to solenoid 64 which restarts the cycle in the same manner that using pushbutton 62 does.

When it is desired to use the car 3 to reciprocate and bring platens 34 and 35 alternately under glass plate 46 as when microphotographing large copy such as a newspaper, electric switch 144 is closed so that, when reciprocating cam 145 passes under reciprocating car-operating electric contact 146 and closes it, current will flow from electric line 69 through switch 144, contact 146 and electric line 147 to solenoid 148 which energizes the solenoid and withdraws dog 149 from notch 150 (one of two notches in reciprocator crank disc 5) and simultaneously electric contact 151 is closed causing current to flow from line 63, through line 152, contact 151 and line 153 to motor 154 which rotates crank disc 5 through reduction gear 155, shell 156 and friction drive washer 157 one half turn when dog 149 falls into the second notch on crank disc 5 and car 3 has travelled the predetermined distance controlled by connecting rod 4 shown in Figure 1.

In the sequence of events, glass plate 46 and frame 47 are lifted from the copy before car 3 is caused to reciprocate by reciprocating cam 145. This is accomplished by passing of cam 158 on the main timer barrel 67 under electric contact 76 and the same series of events occur as was described in the closing of glass plate 46 and frame 47 down on the copy in which shaft 84 and crank disc 81 make one half revolution. Thus the reciprocator makes one movement of one half revolution and the frame 47 control mechanism makes movements of two half turns during the cycle of events making one exposure.

Referring to Figures 3 and 4 which show in detail the devices which accomplish the positive stop of the shaft 131 at points predetermined by notched ring 121 and the provision to allow electric motor 125 to over-run so that the shock of the positive stop will be minimized,—shell 127 is carried in bearing 159 and is further rotatably supported by the shaft 131. Shaft 131 is, in turn, supported by shell 127 and by bracket 160 which is secured to camera body 9 by suitable means, and carries the indexer parts and electric motor 125. To make the friction drive of shaft 131 suitably adjustable, a spring 161 is placed, one end bearing against a shoulder on shell 127 and the other end bearing against a shell-shaped washer 162 which is set up against spring 161 by hardened washer 163 and nut 164 which engages a thread on shaft 131. A rotating joint is made between hardened washer 163 and shell washer 162 which rotates relative to washer 163 and shaft 131 when the motor 125 over-runs. Shell washer 162 is prevented from rotating relative to shell 127 by slot 165 which slidably engages dowel 166 rigidly fixed in shell 127.

Dog 120 is so constructed that it may be set to engage any one of a plurality of notched rings such as 121, 167 and 168, which would each be provided with a number of notches that would, by their spacing, provide the desired spacing of exposure areas of the film. This may be accomplished by mounting dog 120 on a shaft 169 rotatably supported by lugs 170 and bracket 160. Dog 120 may be located on shaft 169 by any suitable means such as set screw 171. The upper end of dog 120 rotatably and slidably engages a shaft 172 which is carried in a yoke 173 attached to plunger core 174 of solenoid 119 so that the action of plunger core 174 may be the same on dog 120 at any setting of dog 120 on shaft 169. Plunger core 174 and dog 120 are returned to at-rest position by spring 175. The sprocket wheel 176 which draws the film through the camera is attached to shaft 131.

The point of dog 120 is large and machined to slidingly fit the periphery of the notched wheel against which it bears, pressed by a spring, as spring 175. This is arranged so that the electric contact 122 may be maintained in closed position after the electric current which energized the solenoid is cut off by the respective cam on timer barrel 67 passing the respective electric contact. In this way, the respective electric motor 125 continues to drive until dog 120 drops into the approaching notch.

The same construction for positive stop and for motor overrunning is also used on the timer barrel 67, glass plate frame 47, crank disc 81 and car reciprocating crank disc 5, and, in modified form for controlling auxiliary timer disc 102.

In Figure 5 is shown an application of the overrunning drive to the take-up for exposed film. Sleeve 127 and other parts, including friction disc 128 and friction washer 129, are of the same construction and function as shown for the indexer in Figure 3 and revolve in bearing 177 in the wall of second magazine 11. Sleeve 127 is driven by gear 133 through an intermediate gear (not shown) from gear 132 on the indexer shown in Figure 3. Shaft 178 is provided with a rigidly fixed friction flange 179, and is driven by friction from friction disc 128 and friction washer 129. The amount of friction is regulated by nut 164 in a similar manner to that used on the indexer shown in Figure 3. Shaft 178 is adapted to receive a winding spool for exposed film, and as the film winds onto said spool, shaft 178 driven by gear 133 through the friction device will revolve a less and varying amount for each exposure area fed forward by sprocket 176 and as the film is taken up the excess rotation will be lost in the slippage between friction plate 128 and friction flange 179.

In Figure 8 a separate notched disc 180 is shown, which may be used instead of notched crank disc 5 on the car reciprocating means, and solenoid 148 and dog 149 perform the same functions as described in reference to Figure 2. Further shown in Figure 8 are arms 181 and 182 which extend from holder frame 47, and engage a pivotal support 183, and are operably connected to crank disc 81 and its mate by the connecting rods 184 and 185 of which the upper ends are shown. In order to keep platens 34 and 35 and book center support 36 from swiveling on their telescopic supports 37, 38 and 39, telescopic guides 186, 187 and 188 are provided. In Figure 8 also appears a partial view of the cam-controlled automatic means for changing the exposure time as described in connection with Figure 1.

In Figure 9 is shown the electric contacts which operate to give the audible alarm when the last end of the film approaches the exposure opening. The film comes from first magazine 10 between roller 189 which is supported by lugs 190 extending from exposure chamber wall 191 and roller 192 which is supported by straps 193 of dielectric material. The roller 192 is of metal and is held down on the film with a slight pressure by spring 194 which also carries electric current from electric wire 136. The film acts as insulation between the two rollers and when the film passes from between them, electric contact is formed and current flows from wire 136 through spring 194, roller 192, roller 189, exposure chamber wall 191 to wire 137 and audible signal 134, thence back to the source of current, as battery 135 shown in Figure 2.

The unexposed film passes from rollers 192 and 189 under pressure plate 195 and over masking strips 196 and 197. Masking strip 197 is shown in Figure 10. The masking strips 196 and 197 are preferably of hardened steel and about two thousandths (.002) of an inch thick so that they form slight ledges over which the edges of the film pass. Thus the portion of the film between the masking strips 196 and 197 passes through a space .002" greater than the edges of the film and so is protected from receiving scratches. The exposure opening is variable lengthways of the film by means of adjustable masking pieces 198, one of which appears in Figures 9 and 10. A spur gear 199 operably connected to a train of spur gears 200 and 201 and two more similar ones on the other half of the exposure chamber (not shown) operate to move the two masking pieces 198 simultaneously and equally toward or away from center. One of gears 200 is operably connected to a handle (not shown) outside the camera body for making desired adjustments of the exposure opening. Side guide plates 202 and 203 hold masking strips 196 and 197 securely in place and also form side guides for the film and for pressure plate 195.

The light lock on first magazine 10 which protects the unexposed film from light while first magazine 10 is detached from camera body 9 and surrounded by light, as when magazine 10 is being carried from the dark room in which it was loaded, is shown in Figures 11 and 12. In these figures an inverted T-shaped member is the light stopper 204 and is moved from the position shown, downward by handlebar 205 which projects outside the body of first magazine 10. A guide block 206 slidably engages the stem of light stopper 204 and is attached to stepped light lock piece 207 by suitable means, as by bolts 208. Light stopper 204 is preferably faced on the T head by a yielding material 209 such as leather, rubber, or velvet which will make a secure light stop of film slot 210 when the starting end of the film is projecting through film slot 210 and out of first magazine 10 as is necessary in order to start the film through camera body 9, as filled first magazine 10 is assembled on camera body 9.

Side plates 211 and 212 are rigidly attached to guide block 206 and to lower anvil block 213 and form supports for axles 214 and 215 on which idle rollers 216 and 217 revolve. Anvil block 213 is rigidly attached to stepped light lock piece 207, as by bolt 218, and has a concave upper surface which registers with the convex surface of light stopper 204 so that the film is bent when the light lock is closed and thus the light lock is made more secure. Apertures in side plates 211 and 212 also register with light stopper 204 for the same purpose. Stepped light lock piece 207 is rigidly attached to first magazine 10 as by bolts 219, and registers with a female stepped aperture on camera body 9 to which it is secured by suitable means, as by studs which enter holes 220.

In order to disconnect second magazine 11 from camera body 9 without light damage to the film, a light lock is provided on each member, features of which are shown in Figures 13 and 14. In camera body 9 the film travels from the exposure area, under idler roller 221 which is located between lugs on exposure chamber body 191 in the direction of arrows 222 and 223, thence around sprocket 176 and under light lock roller 224 into film slot 225. To complete the light lock without pressure being put on the film, light lock blocks 226 and 227 are provided, which are attached to disc plate 228 and are connected to side plates (not shown). There is an annular space wide enough for the film to pass freely through between light lock block 226 and light lock roller 224, but as the path of the film is narrow and bent from a straight line, any light which might enter the exposed end of film slot 225 is unable to pass the curved path around light lock roller 224.

The stepped light lock 229 is rigidly attached to camera body 9 as by clamp 230 and is composed of three discs 228, 231 and 232 which are joined rigidly together by suitable means and form stepped light lock 229. Disc 228 has an aperture through which pin 233 extends to an operable connection to the cut-off knife 234, which slides up and down in a suitable rectangular aperture in disc 231 and is guided therein by plate 235 which has an aperture for pin 233 and a slot which forms a continuation of film slot 225. This plate 235 also acts as the lower blade of the cut-off shear in conjunction with cut-off knife 234. Disc 232 has an aperture which forms a continuation of film slot 225 but of enlarged area so as to allow the severed end of the film to bend when cut by knife 234. Knife 234, when moved downward by operating handle 236 forms an additional light lock, and remains in that position until it is desired to run through a length of film suitable for threading into the empty second magazine 11, when it is re-attached to camera body 9 after the exposed film has been removed in a dark room.

Second magazine 11 is provided with a stepped light lock 237, composed of a stepped disc 238 and discs 239 and 240 which are rigidly held together, and, as a unit, are rigidly attached to second magazine 11. Apertures through discs 238, 239 and 240 form a continuation of film slot 225. Disc 239 is provided with a suitable rectangular aperture in which light lock plate 241 slides, moved by pin 242, operated by handle 243. Plate 244 cooperates with light lock plate 241 to guide it and form a light lock. To disc 240 are rigidly attached light lock blocks 245 and 246 which together with side plates 247 and 248 support light lock rollers 249 and 250. Side plate 248 is shown, partly sectioned, in Figure 14. When light lock plate 241 is raised to allow film to pass through the continuation of film slot 225, the bent path around light lock rollers 249 and 250 prevents light from entering film slot 225 from open second magazine 11. Light is locked from passing the ends of light lock rollers 224 and 249 and 250 by annular projections from the ends of the rollers which project into annular slots in the side pieces, as in side piece 248 in Figure 14.

It is necessary to remove the cover plate (not shown) from second magazine 11 when replacing the magazine on camera body 9 in order to attach the leading end of the film to the take-up spool on take-up spindle shaft 178.

Having disclosed and illustrated the various structures comprising my invention, what I claim is:

In a microphotographic apparatus, the combination of a photographic camera including detachable means for containing unexposed film, detachable means for containing exposed film, a camera body, a film support, an exposure opening, electrically operated means for intermittently feeding film past the exposure opening, means for taking up the exposed film, with means for supporting the photographic camera at the selected distance from the copy or material to be photographed, means for supporting and holding successive pages of the copy at a predetermined height, means for shifting the copy support to bring selected portions of the copy before the exposure opening, cam-operated means for automatically focusing the camera lens, cam-operated means for automatically increasing the exposure time when the camera is placed nearer the copy and decreasing the exposure time when the camera is moved farther away from the copy, electric motor driven cycle means comprising starting switch, timer barrel, timer barrel driving electric motor and control contacts, a plurality of electric contacts adjacent to said timer barrel, a plurality of cams on said timer barrel adapted, at predetermined intervals, to close and open said electric contacts, said electric contacts being adapted to furnish electric current to electrically operable means for closing said copy-holding means, for opening and closing the camera shutter, for providing additional duration of shutter opening, for indexing the film, for optionally providing continuous running of the cycle, for shifting the copy support a predetermined amount, and for opening the copy-holding means, an audible signal when the last end of the unexposed film approaches the said exposure opening, a visible signal located outside the camera to indicate the occurrence and duration of the shutter opening, and scanning means to indicate the area of copy included in the image on the film.

JOHN HUGH O'NEILL.